United States Patent
Lee

(10) Patent No.: US 12,461,857 B2
(45) Date of Patent: Nov. 4, 2025

(54) STORAGE DEVICE, OPERATING METHOD THEREOF, AND ELECTRONIC DEVICE

(71) Applicant: Samsung Electronics Co., Ltd., Suwon-si (KR)

(72) Inventor: Jinwoong Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 147 days.

(21) Appl. No.: 18/455,555

(22) Filed: Aug. 24, 2023

(65) Prior Publication Data

US 2024/0220414 A1 Jul. 4, 2024

(30) Foreign Application Priority Data

Dec. 28, 2022 (KR) .................. 10-2022-0187761

(51) Int. Cl.
*G06F 12/0804* (2016.01)

(52) U.S. Cl.
CPC .. *G06F 12/0804* (2013.01); *G06F 2212/1021* (2013.01)

(58) Field of Classification Search
CPC ............. G06F 12/0804; G06F 2212/1021
See application file for complete search history.

(56) References Cited

U.S. PATENT DOCUMENTS

| | | | |
|---|---|---|---|
| 5,875,452 A | 2/1999 | Katayama et al. | |
| 5,978,304 A * | 11/1999 | Crafts | G11C 8/12 365/230.02 |
| 9,632,562 B2 | 4/2017 | Quach et al. | |
| 9,728,244 B2 | 8/2017 | Kim | |
| 9,972,375 B2 | 5/2018 | Parks et al. | |
| 10,332,582 B2 | 6/2019 | Suh et al. | |
| 10,373,668 B2 | 8/2019 | Kim et al. | |
| 10,867,655 B1* | 12/2020 | Harms | G11C 29/52 |
| 2007/0180187 A1 | 8/2007 | Olson et al. | |
| 2009/0077307 A1* | 3/2009 | Kaburlasos | G06F 12/0292 711/E12.002 |
| 2014/0281637 A1* | 9/2014 | Bahnsen | G11C 11/4074 713/324 |
| 2020/0058348 A1* | 2/2020 | Belcourt | G06F 3/0607 |
| 2020/0135264 A1* | 4/2020 | Brady | G11C 11/406 |
| 2022/0236873 A1 | 7/2022 | Meriö | |
| 2022/0261184 A1* | 8/2022 | Mylavarapu | G06F 3/0644 |

FOREIGN PATENT DOCUMENTS

KR 10-2016-0111643 A 9/2016

OTHER PUBLICATIONS

Extended European Search Report dated Feb. 7, 2024 issued in European Patent Application No. 23196802.5-1224.

* cited by examiner

*Primary Examiner* — Prasith Thammavong
(74) *Attorney, Agent, or Firm* — Harness, Dickey & Pierce, P.L.C.

(57) ABSTRACT

A storage device, an operation method thereof, and an electronic device are disclosed. A storage device includes a main memory comprising a first segment that is not masked and a second segment that is masked, a cache memory configured to store some metadata stored in the main memory, and a memory controller configured to map a physical address of the second segment to a physical address of the first segment in a remap table for dirty metadata to be stored in the second segment in response to a cache miss occurring.

9 Claims, 17 Drawing Sheets

STORAGE DEVICE, OPERATING METHOD THEREOF, AND ELECTRONIC DEVICE

CROSS-REFERENCE TO RELATED APPLICATION

This application is based on and claims priority under 35 U.S.C. § 119 to Korean Patent Application No. 10-2022-0187761, filed on Dec. 28, 2022, in the Korean Intellectual Property Office, the disclosure of which is incorporated by reference herein in its entirety.

BACKGROUND

Various example embodiments relate to an electronic device, and more particularly, to a storage device for partially performing a refresh operation, and/or an operating method thereof, and and/or an electronic device.

Semiconductor memories are widely used to store data in various electronic devices such as computers, wireless communication devices, cameras, digital displays, and the like. Data is stored by programming various states of a semiconductor memory. In order to access stored data, at least one stored state of the semiconductor memory may be read and/or sensed. To store data, components of a device may write and/or program the state of a semiconductor memory.

Various types of semiconductor memories exist. Volatile memory, such as DRAM, may lose its stored state when external power is disconnected. In addition, over time, the state of the semiconductor memory may deteriorate, resulting in unrecoverable memory errors or other problems. As a highly integrated memory is implemented, research to reduce power consumption in the memory has been continued.

SUMMARY

Various example embodiments provide a storage device for saving or improving power consumption of a memory, an operating method thereof, and/or an electronic device.

According to some example embodiments, there is provided a storage device comprising a main memory comprising a first segment in which a refresh operation is enabled and a second segment that is masked to disable the refresh operation, a cache memory configured to store some metadata stored in the main memory, and a memory controller configured to control the main memory, wherein the deice is configured to operate such that dirty metadata is stored in the second segment in response to a cache miss occurring, and to logically move the dirty metadata from the second segment to the first segment based on a remap table by mapping a physical address of the second segment in which the dirty metadata is to be stored to a physical address of the first segment.

Alternatively or additionally according to some example embodiments, there is provided a method of operating a storage device, the method includes mapping a physical address of a first segment group among a plurality of segments to a physical address of a second segment group, the first segment group being a group in which metadata to be cache hit are stored, the second segment group being a masked group such that a refresh operation is disabled among the plurality of segments based on a remap table, and copying dirty metadata to be stored in the second segment group to the first segment group in response to a cache miss occurring.

Alternatively or additionally according to some example embodiments, there is provided a storage device comprising a main memory including a first segment in which a refresh operation is enabled and a second segment that is masked to disable the refresh operation, a cache memory configured to store some metadata stored in the main memory, and a memory controller configured to control the main memory such that dirty metadata is stored in the second segment in response to a cache miss occurring, and to store a data chunk in the first segment, the data chunk comprising the dirty metadata and write log data for the dirty metadata.

Alternatively or additionally, there is provided an electronic device comprising a volatile external memory including a first segment configured to enable a refresh operation and a second segment that is masked so as to be configured to disable the refresh operation, and a system-on-a-chip (SOC) configured to control the volatile external memory. The SOC may be configured to control the volatile external memory to copy the metadata to be cache hit to the second segment based on a remap table by mapping a physical address of the first segment to a physical address of the second segment for the metadata stored in the first segment and to be cache hit, and may control the volatile external memory to copy dirty metadata to be stored in the second segment to the first segment in response to a cache miss occurring.

BRIEF DESCRIPTION OF THE DRAWINGS

Embodiments will be more clearly understood from the following detailed description taken in conjunction with the accompanying drawings in which.

DETAILED DESCRIPTION OF VARIOUS EXAMPLE EMBODIMENTS

Hereinafter, various example embodiments will be described in detail with reference to the accompanying drawings.

Figure 1:
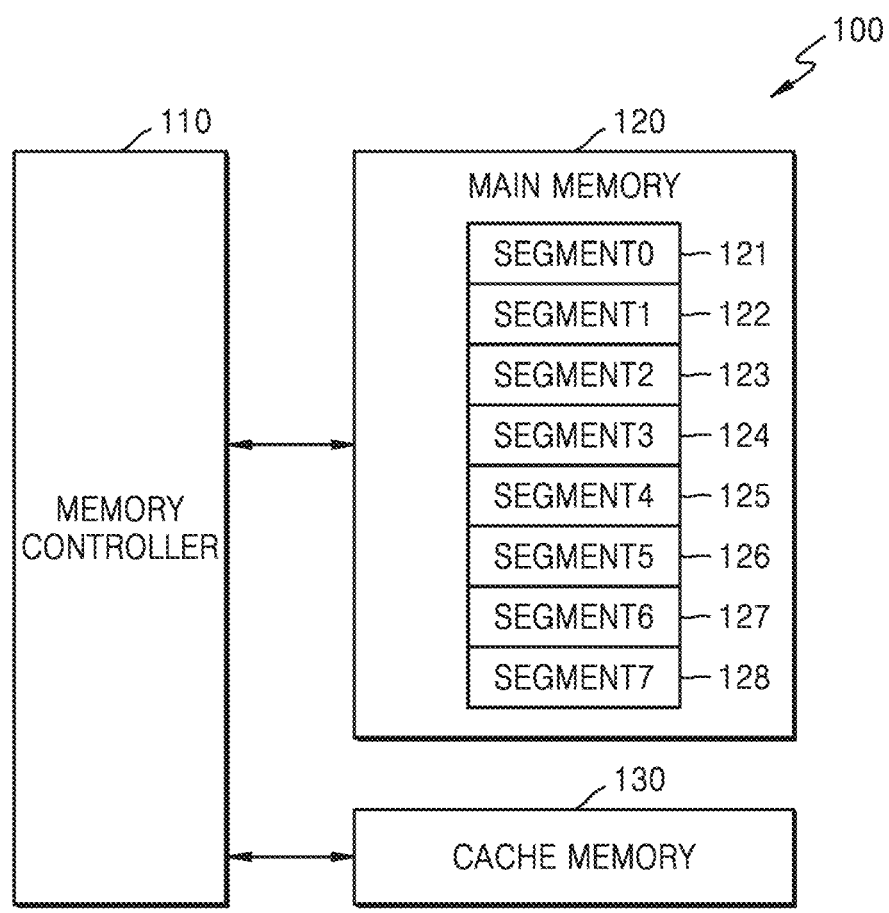
FIG. 1 is a diagram for explaining a storage device according to some example embodiments.

FIG. 1 is a diagram for describing a storage device according to some example embodiments.

Referring to FIG. 1, the storage device 100 may include a memory controller 110, a main memory 120, and a cache memory 130. The memory controller 110, main memory 120, and cache memory 130 may be integrated into one semiconductor device. For example, the memory controller 110, main memory 120, and cache memory 130 may be integrated into a single semiconductor device to form a solid state drive (SSD). Alternatively or additionally, the memory controller 110, the main memory 120, and the cache memory 130 may be integrated into a single semiconductor device, such as one or more of a memory card, a PC card, a compact flash card, a smart media card, a memory stick, multimedia cards, SD cards, and a universal flash memory device.

The memory controller 110 may communicate with the outside through various standard interfaces. For example, the memory controller 110 includes an interface circuit (not shown), and the interface circuit may provide a standard interface. The standard interface may include various interface methods such as one or more of advanced technology attachment (ATA), serial ATA (SATA), external SATA (e-SATA), small computer small interface (SCSI), serial attached SCSI (SAS), peripheral component interconnection (PCI), PCI express (PCI-E), IEEE 1394, universal serial bus (USB), secure digital (SD) card, multimedia card (MMC), embedded multimedia card (eMMC), universal flash storage (UFS), compact flash (CF) card interface, etc.

The memory controller 110 may control some or up to all of the overall operations of the storage device 100. For example, the memory controller 110 may write and/or read data by controlling the main memory 120 and/or the cache memory 130 according to an external request (e.g., from a host).

In various example embodiments, the memory controller 110 may issue commands and addresses to control the operation of the main memory 120. Here, the commands may include, for example, one or more of an active command, a pre-charge command, a read command, a write command, a refresh command, a mode register setting command, a mode register read command, or a mode register write command.

In various example embodiments, the memory controller 110 may determine a cache hit or cache miss in the cache memory 130, based on the memory address.

When a cache hit occurs, the memory controller 110 may perform a read operation by returning data stored in an address corresponding to the corresponding memory address in the cache memory 130. Alternatively or additionally, when a cache hit occurs, the memory controller 110 may perform a write operation in a write-through method and/or a write-back method. The write-through method is or includes a method in which each block (or data stored in the block) of the cache memory 130 and the main memory 120 is modified. In the write-back method, only a block of the cache memory 130 is modified once, and when the content of the corresponding block is later excluded (or kicked out) from the cache memory 130, the content of the corresponding block is reflected in the block of the main memory 120.

Meanwhile, when a cache miss occurs, the memory controller 110 may perform a read operation by returning corresponding data from the main memory 120. Alternatively or additionally, when a cache miss occurs, the memory controller 110 may perform a write operation only on the main memory 120 in a no-write-allocate method and/or a write-allocate method. The no-write-allocate method is or includes a method of modifying only blocks of the main memory 120, and the write-allocate method is or includes a method of updating cache lines after a block of the main memory 120 is modified and the corresponding block is loaded onto the cache memory 130.

The main memory 120 may store data or output stored data. The main memory 120 may be implemented as a volatile memory such as Dynamic Random Access Memory (DRAM) according to a standard. Specifically, for example, the main memory 120 may be a volatile memory, such as one or more of a synchronous DRAM (SDRAM), a Double Data Rate SDRAM (DDR SDRAM), a Low Power Double Data Rate SDRAM (LPDDR SDRAM), a Graphics Double Data Rate SDRAM (GDDR SDRAM), a DDR2 SDRAM, a DDR3 SDRAM, a DDR4 SDRAM, a DDR5 SDRAM, a low power double data rate 4th generation (LPDDR4) DRAM, a low power double data rate 5th generation (LPDDR5) DRAM, and the like. However, example embodiments are not limited thereto.

In various example embodiments, the main memory 120 may include a memory region for storing data. Metadata may be stored in most regions of the memory region. For example, metadata may be stored in a region corresponding to about 90% of the memory region, and other data such as user data may be stored in a region corresponding to about 10% of the memory region. However, example embodiments are not limited thereto.

In various example embodiments, the memory region of the main memory 120 may be divided into a number of segments, such as first to eighth segments 121 to 128. The first to eighth segments 121 to 128 may be divided into eight according to the LPDDR specification, but example embodiments are not limited thereto.

In various example embodiments, a refresh operation is allowed in some segment groups of the first to eighth segments 121 to 128, and among the first to eighth segments 121 to 128, the remaining segment groups may be masked, e.g. excluded, so as to disable the refresh operation. Here, the segment group may include one or more segments. The refresh operation may be or include, for example, a self-refresh operation or an auto refresh operation. The masking of segments will be described later with reference to FIG. 4. When the refresh operation is performed on only some segment groups among the first to eighth segments 121 to 128, an amount of current required for the refresh operation is reduced, and thus, there may be an advantage insofar as the power consumption of the main memory 120 may be reduced.

The cache memory 130 may store, e.g. may temporarily store some data stored in the main memory 120. In various example embodiments, when a cache miss occurs data may be moved from the cache memory 130 to the main memory 120. The cache memory 130 may be implemented as SRAM, but example embodiments is not limited thereto.

In various example embodiments, the cache memory 130 may alternatively or additionally store some metadata stored in the main memory 120.

Although not shown, the storage device 100 may further include various types of non-volatile memories, such as one or more of a flash memory, a magnetic RAM (MRAM), a spin-transfer torque MRAM, a conductive bridging RAM (CBRAM), a ferroelectric RAM (FeRAM), and phase-change RAM (PRAM).

As described above, there may be an effect of reducing power consumption by the storage device 100.

Figure 2:
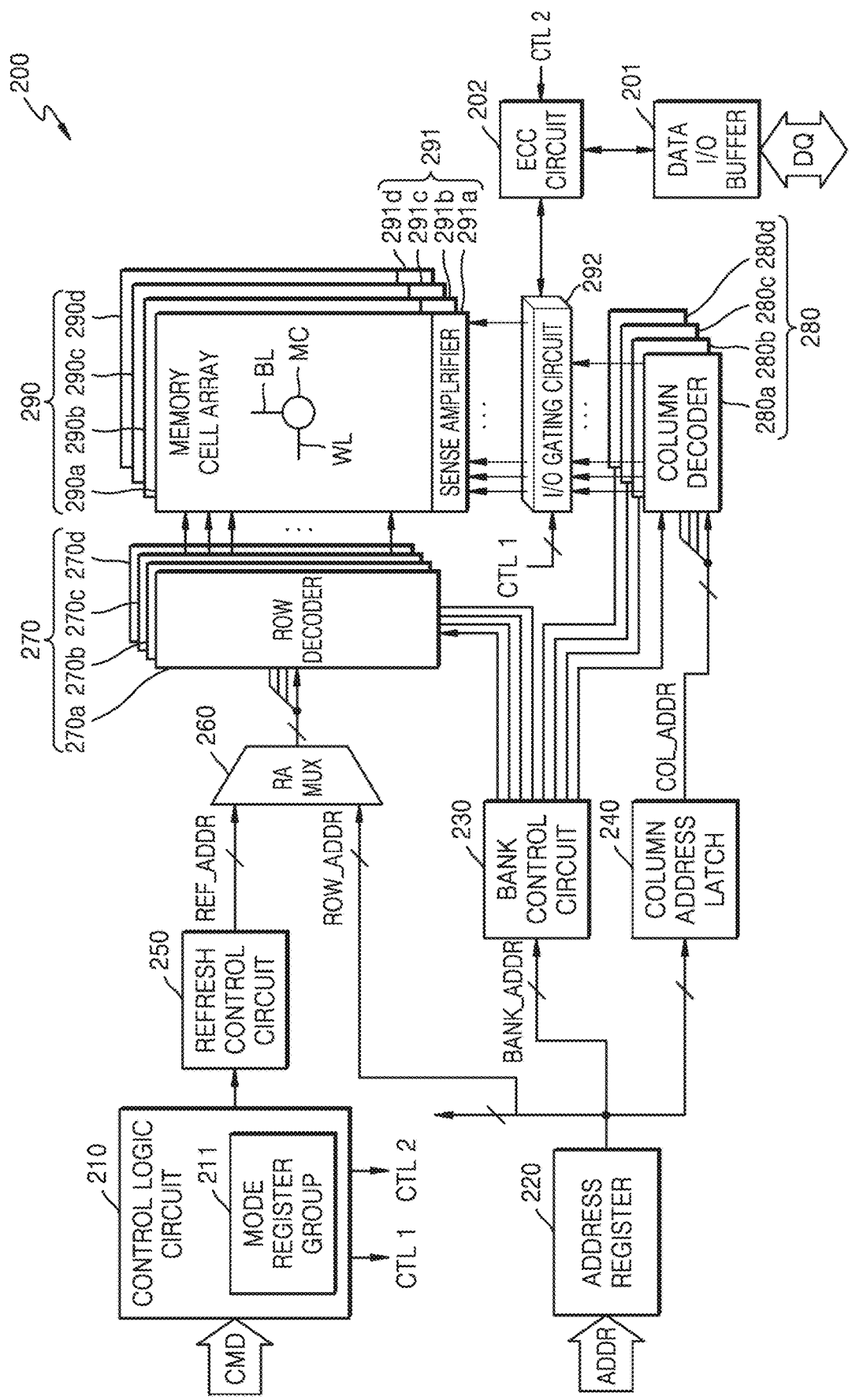
FIG. 2 is a diagram for explaining a main memory according to some example embodiments.

FIG. 2 is a diagram for explaining a main memory 200 according to some example embodiments.

Referring to FIG. 2, the main memory 200 may correspond to the main memory 120 of FIG. 1. The main memory 200 may be implemented as DRAM; however, example embodiments are not limited thereto.

The main memory 200 may include a control logic circuit 210, an address register 220, a bank control circuit 230, a column address latch 240, a refresh control circuit 250, a row address multiplexer 260, a row decoder 270, a column decoder 280, a memory cell array 290, a sense amplifier 291, an input/output gating circuit 292, a data input/output buffer 201, and an ECC circuit 202.

The memory cell array 290 may include a number of bank arrays such as first to fourth bank arrays 290a to 290d. Each of the first to fourth bank arrays 290a to 290d may include a memory cell MC formed at or arranged at or close to a point where a word line WL and a bit line BL cross each other. The number of memory cells MC may be a plurality. Each of the first to fourth bank arrays 290a to 290d may include a plurality of pages configured of memory cell rows connected to respective word lines WL.

In various example embodiments, the memory cell array 290, as a memory region, may be divided into a plurality of segments. For example, the memory cell array 290 may be divided into 8 segments.

The row decoder 270 may include a number of bank row decoders such as first to fourth bank row decoders 270a to 270d respectively connected to the first to fourth bank arrays 290a to 290d.

The column decoder 280 may include a number of column row decoders such as first to fourth bank column decoders 280a to 280d respectively connected to the first to fourth bank arrays 290a to 290d.

The sense amplifier 291 may include a number of sense amplifiers such as first to fourth bank sense amplifiers 291a to 291d respectively connected to the first to fourth bank arrays 290a to 290d.

The first to fourth bank arrays 290a to 290d, the first to fourth bank sense amplifiers 291a to 2914, the first to fourth bank column decoders 280a to 280d, and the first to fourth bank row decoders 270a to 270d may configure first to fourth banks, respectively. In FIG. 2, the memory cell array 290 including four banks is illustrated, but example embodiments are not limited thereto. According to various example embodiments, the memory cell array 290 may include any number of banks.

The address register 220 may receive an address ADDR including a bank address BANK_ADDR, a row address ROW_ADDR, and a column address COL_ADDR. The address register 220 may provide the address ADDR to the control logic circuit 210. The address register 220 may provide the bank address BANK_ADDR to the bank control circuit 230. The address register 220 may provide the row address ROW_ADDR to the row address multiplexer 260. The address register 220 may provide the column address COL_ADDR to the column address latch 240. In some example embodiments, there may be redundancy checking circuitry (not illustrated) that remaps or readdresses each of the bank address BANK_ADDR, the column address COL_ADDR, and the row address ROW_ADD to a redundancy portion of the memory cell array 290.

The bank control circuit 230 may generate bank control signals in response to the bank address BANK_ADDR. The bank control signals may be provided to the first to fourth bank row decoders 270a to 270d and the first to fourth bank column decoders 280a to 280d. Among the first to fourth bank row decoders 270a to 270d, a bank row decoder corresponding to the bank address BANK_ADDR may be activated. Among the first to fourth bank column decoders 280a to 280d, a bank column decoder corresponding to the bank address BANK_ADDR may be activated.

The refresh control circuit 250 may generate a refresh row address REF_ADDR for refreshing a plurality of memory cell rows included in the memory cell array 290 according to the control of the control logic circuit 210. The refresh control circuit 250 may be included in the main memory 200 when the memory cells MC of the memory cell array 290 are configured of dynamic memory cells.

In various example embodiments, the refresh control circuit 250 may perform a self-refresh operation on some segments among a plurality of segments in an idle state. For example, the refresh control circuit 250 may generate a refresh row address (REF_ADDR) with respect to memory cell rows included in some segments among a plurality of segments according to a code value written to a first mode register included in a mode register group 211. The first mode register will be described later with reference to FIG. 4.

In various example embodiments, the refresh control circuit 250 may perform an auto refresh operation on at least some segments among a plurality of segments in response to a refresh command provided from the outside. For example, the refresh control circuit 250 may perform a self-refresh operation for only some segments among a plurality of segments according to code values written to first and second mode registers included in the mode register group 211. The second mode register will be described later with reference to FIG. 5.

The row address multiplexer 260 may receive a row address ROW_ADDR from the address register 220 and receive a refresh row address REF_ADDR from the refresh control circuit 250. The row address multiplexer 260 may selectively output the row address ROW_ADDR or the refresh row address REF_ADDR as a row address. The row addresses may be applied to the first to fourth bank row decoders 270a to 270d, respectively.

A bank row decoder activated by the bank control circuit 230 among the first to fourth bank row decoders 270a to 270d may decode the row address output from the row address multiplexer 260 and may activate a word line corresponding to the row address. For example, an activated bank row decoder may apply a word line driving voltage to a word line corresponding to a row address.

The column address latch 240 may receive the column address COL_ADDR from the address register 220 and temporarily store the received column address COL_ADDR. Also, the column address latch 240 may gradually increase the received column address COL_ADDR in a burst mode. The column address latch 240 may apply the temporarily stored and/or gradually increased column address COL_ADDR to the first to fourth bank column decoders 280a to 280d, respectively.

Among the first to fourth bank column decoders 280a to 280d, a bank column decoder activated by the bank control circuit 230 may activate a sense amplifier corresponding to the bank address BANK_ADDR and the column address COL_ADDR through the input/output gating circuit 292.

The input/output gating circuit 292 may include data gating circuits, an input data mask logic, data latches, and write drivers.

The data input/output buffer 201 may provide main data received through a data channel DQ to the ECC circuit 202 in a write operation, and may provide main data provided from the ECC circuit 202 to the memory controller 110 in a read operation.

In a write operation, the ECC circuit 202 may generate parity data based on main data provided from the data input/output buffer 201. Also, the ECC circuit 202 may provide a codeword including the main data and the parity data to the input/output gating circuit 292. At this time, the input/output gating circuit 292 may transmit the codeword to an activated bank array.

In a read operation, the ECC circuit 202 may receive a codeword read from one bank array from the input/output gating circuit 292. Then, the ECC circuit 202 may perform decoding on the main data based on the parity data included in the codeword. In addition, the ECC circuit 202 may correct an error of a single-bit (or 1-bit) included in the main data and may provide the corrected error to the data input/output buffer 201.

The control logic circuit 210 may control up to all of the overall operations of the main memory 200. For example, the control logic circuit 210 may generate control signals that instruct to perform a write operation or a read operation. To this end, the control logic circuit 210 may include a command decoder that decodes a command CMD and generates a first control signal CTL1 for controlling the input/output gating circuit 292 and a second control signal CTL2 for controlling the ECC circuit 202.

The control logic circuit 210 may include the mode register group 211. The mode register group 211 may store data including bit values (or code values) for setting parameters related to an operation mode of the main memory 200. The mode register group 211 may include a plurality of mode registers. In various example embodiments, the mode register group 211 may include first and second mode registers. The first mode register may be a register for setting masked segments and non-masked segments among a plurality of segments. The second mode register may be a register for setting whether to support a partially performed refresh operation for some segments.

Figure 3:
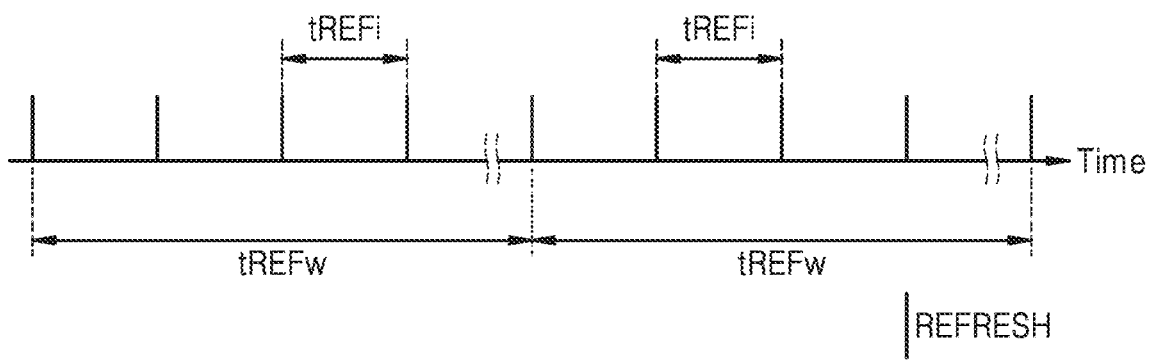
FIG. 3 is a diagram for explaining timing of a refresh operation according to some example embodiments.

FIG. 3 is a diagram for explaining timing of a refresh operation according to some example embodiments.

Referring to FIG. 3, a refresh window such as a 32 millisecond (ms) refresh window time tREFw defined in the LPDDR5 standard may be set. Within one refresh window time tREFw, refresh commands may be issued at intervals of a basic refresh rate time tREFi. As the refresh command is issued, a refresh operation REFRESH may be performed.

Figure 4:
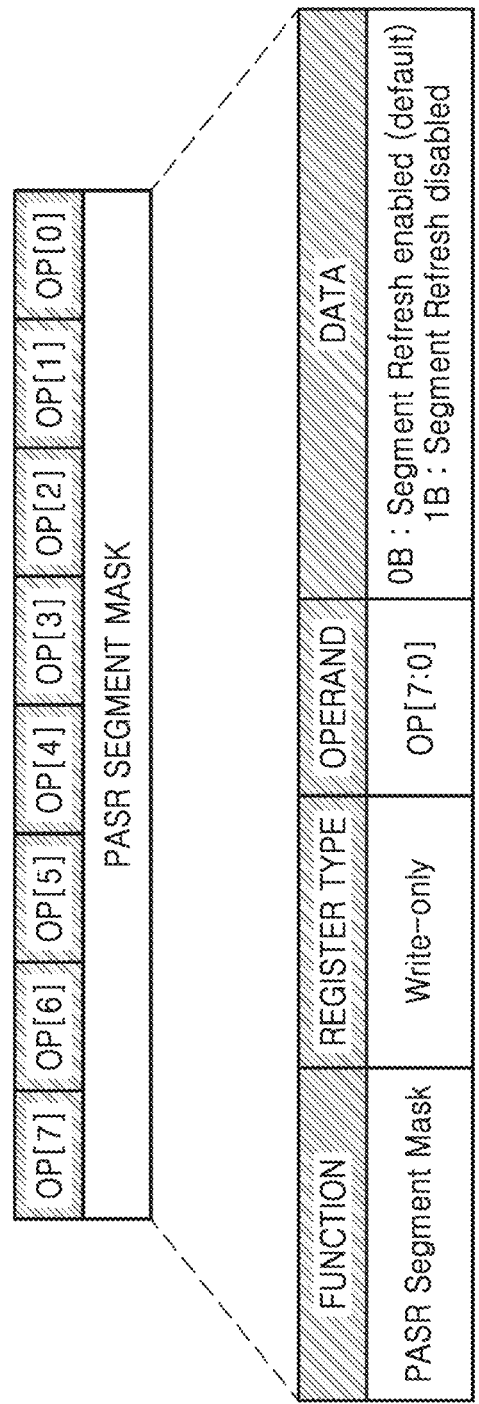
FIG. 4 is a diagram for explaining a first mode register according to some example embodiments.

FIG. 4 is a diagram for explaining a first mode register according to some example embodiments.

Referring to FIG. 4, the first mode register may be included in the mode register group 211 of FIG. 2. For example, the first mode register may be any one mode register included in the mode register group 211 of FIG. 2. The first mode register may be or include, for example, mode register 23 (or "MR23") according to the LPDDR5 standard.

Figure 5:
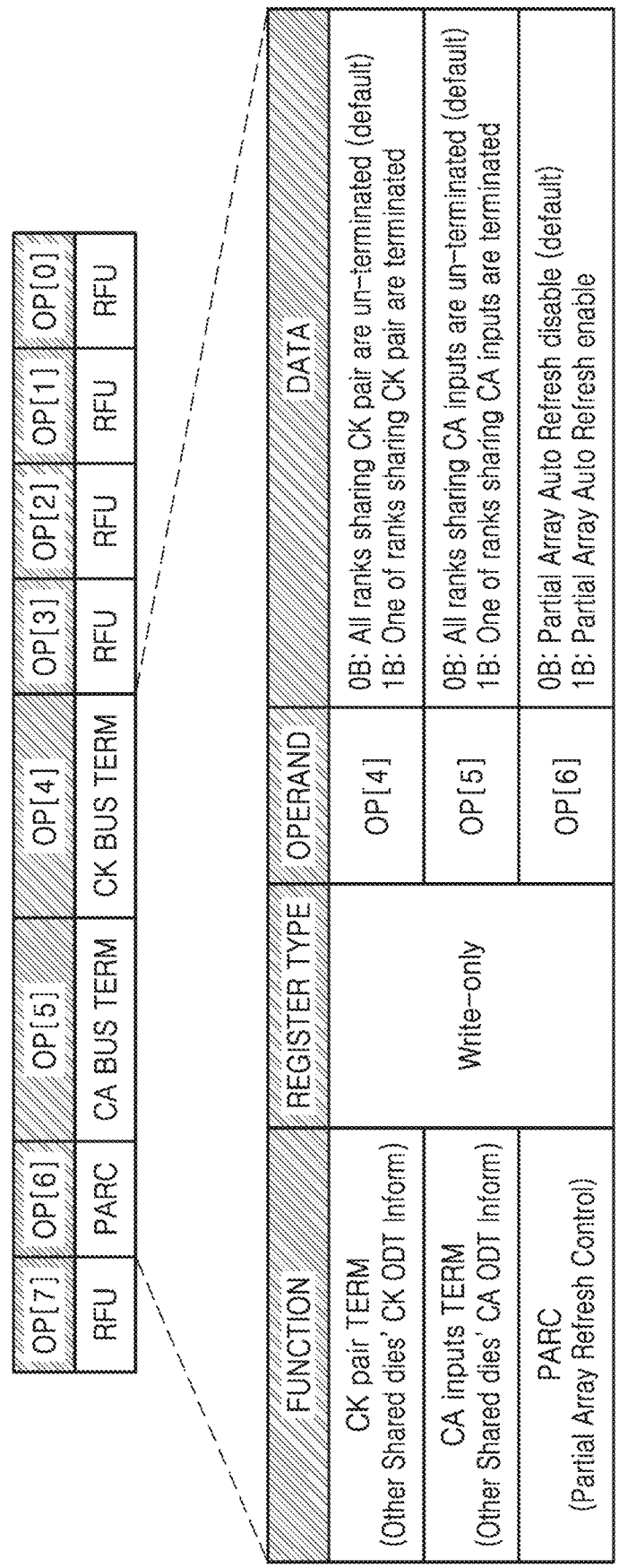
FIG. 5 is a diagram for explaining a second mode register according to some example embodiments.

According to the LPDDR5 standard, the code values (OP[7:0]) of the operand shown in FIG. 4 may include values indicating whether or not to mask segments for Partial Array Self Refresh (PASR). A value indicating whether to mask a segment for PASR may be referred to as "PASR SEGMENT MASK" as shown in FIG. 5. The PASR may be or include a self-refresh operation performed only on unmasked segments. A segment that is not masked may be referred to as an "un-masking segment".

Referring to FIGS. 1 and 4, for example, a code value of an operand (OP[0]) may indicate whether or not the first segment 121 is masked. The code value of the operand (OP[1]) may indicate whether or not the second segment 122 is masked. The code value of the operand (OP[2]) may indicate whether or not the third segment 123 is masked. The code value of the operand (OP[3]) may indicate whether or not the fourth segment 124 is masked. Similarly, the code values of the operands (OP[4], OP[5]. OP[6], and OP[7]) are values indicating whether or not each of the fifth segment 125, the sixth segment 126, the seventh segment 127, and eighth segment 128 is masked.

As shown in FIG. 4, when the code value of a specific operand is "0B", a self-refresh operation for the corresponding segment is enabled. If the code value of a specific operand is "1B", the corresponding segment is masked, and the self-refresh operation for the masked segment is disabled. Referring to FIGS. 1 and 4, for example, if a code value of the operand (OP[0]) is "1B", the first segment 121 is masked, and the self-refresh operation for the first segment 121 is disabled. For another example with reference to FIGS. 1 and 4, if code values of an operand (OP[4:0]) are "0B" and code values of an operand (OP[7:5]) are "1B", the self-refresh operation may be performed only on the first to fifth segments 121 to 125 (or a segment group including the first to fifth segments 121 to 125). A masked segment may be referred to as a "masking segment".

When the memory controller 110 provides a mode register write command and an address to the main memory 120, code values of operands (OP[7:0]) may be determined. For example, the register type of the first mode register may be write-only.

According to PASR, because the self-refresh operation is not performed for the masking segment, there may be an advantage insofar as power consumption may be reduced when the main memory 120 enters a self refresh-power down (SR-PD) state from an idle state.

FIG. 5 is a diagram for explaining a second mode register according to some example embodiments.

Referring to FIG. 5, the second mode register may be included in the mode register group 211 of FIG. 2. For example, the second mode register may be or may include any one mode register included in the mode register group 211 of FIG. 2. The second mode register may be or include, for example, a mode register 25 (or "MR25") according to the LPDDR5 standard.

According to the LPDDR5 standard, the code values of operands (OP[3:0], OP[7]) are Reserved Future Usage (RFU), and code values of operands (OP[6:4]) may respectively indicate whether "CK pair TERM", "CA inputs TERM", and "Partial Array Refresh Control (PARC)" are supported or not.

In the case of "CK pair TERM", if the code value of the operand (OP[4]) is "0B", all ranks sharing the CK pair (i.e., clock pair) are not terminated. If the code value of the operand (OP[4]) is "1B", any rank among all ranks sharing the CK pair is terminated.

In the case of "CA inputs TERM", if the code value of the operand (OP[5]) is "0B", all ranks sharing CA inputs (i.e., command/address inputs) are not terminated. If the code value of the operand (OP[5]) is "1B", any rank among all ranks sharing CA inputs is terminated.

PARC may be or correspond to an auto refresh operation performed only on unmasked segments. According to the PARC, even if the memory controller 110 provides the main memory 120 with a refresh command and address instructing to perform an auto refresh operation on the masking segment, the main memory 120 may ignore the refresh command and address. In the case of PARC, if the code value of the operand (OP[6]) is "0B", PARC is disabled. If the code value of the operand (OP[6]) is "1B", PARC is enabled. In this case, as described above with reference to FIG. 4, in the case when a specific segment is masked in the first mode register, PARC may not be performed on the masked segment, but PARC may be performed only on the unmasked segment.

According to PARC, because the refresh operation is not performed on the masking segments, there may be an advantage insofar as power consumption may be reduced as much as the refresh current (e.g., IDD5 according to the standard) in the active or idle state of the main memory 120.

Figure 6:
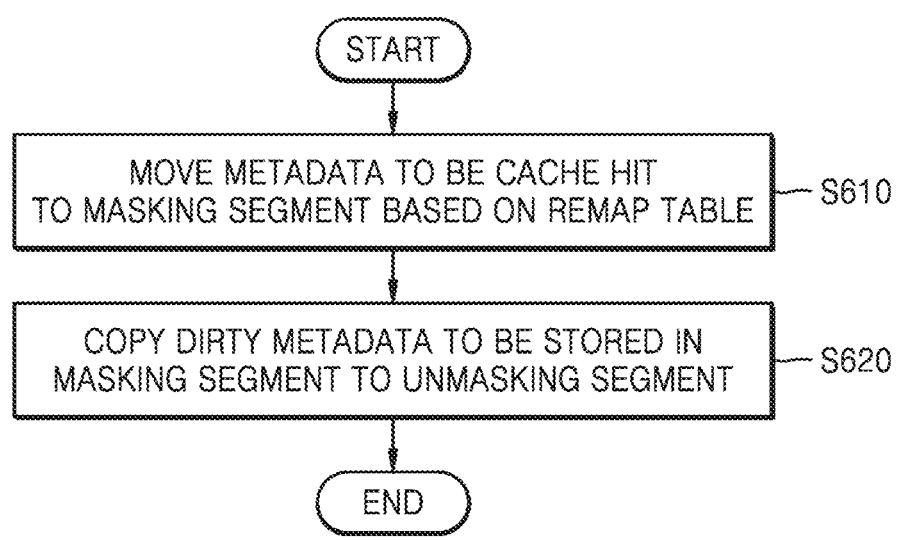
FIG. 6 is a flowchart illustrating a method of operating a storage device according to some example embodiments.

FIG. 6 is a flowchart illustrating a method of operating a storage device according to some example embodiments.

Referring to FIGS. 1 and 6, an operation of moving metadata to be cache hit to a masking segment based on a remap table is performed (S610). Among metadata stored in the main memory 120, metadata stored in the cache memory 130 may be cache hit. Because metadata to be cache hit is stored in the cache memory 130, metadata to be cache hit may not be maintained in the main memory 120, which may lead to reduce power consumption of the main memory 120.

In various example embodiments for the operation S610, the memory controller 110 maps physical addresses of the first segment group to physical addresses of the second segment group based on the remap table, and thus, metadata to be cache hit may be moved in the masking segment. Here, the first segment group may include one or more segments in which metadata to be cache hit is stored among a plurality of segments (for example, the first to eighth segments 121 to 128). The first segment group may include one or more unmasking segments. The second segment group may include one or more masking segments to inhibit a refresh operation among a plurality of segments.

An operation of copying dirty metadata to be stored in the masking segment to the unmasking segment is performed (S620). The dirty metadata may be or correspond to metadata to be stored in the main memory 120 when a cache miss occurs. If dirty metadata is stored in the masking segment when a cache miss occurs, because a refresh operation is not performed on the masking segment, the dirty metadata may not be preserved. Therefore, it may be necessary or desirable to copy the dirty metadata to the unmasking segment.

In various example embodiments for the operation S620, dirty metadata to be stored in the second segment group may be copied to the first segment group when a cache miss occurs. Here, the first segment group may include only unmasking segments. The second segment group may include only masking segments.

As described above, there may be an effect of reducing power consumption of the main memory 120 by moving metadata to be cache hit to the masking segment and copying dirty metadata to the unmasking segment.

Alternatively or additionally, as described above, because a refresh operation is not performed on the masking segments, there may be an effect of saving power consumption in proportion to the number of masking segments in a power gating state of a storage device, such as an SSD.

Figure 7:
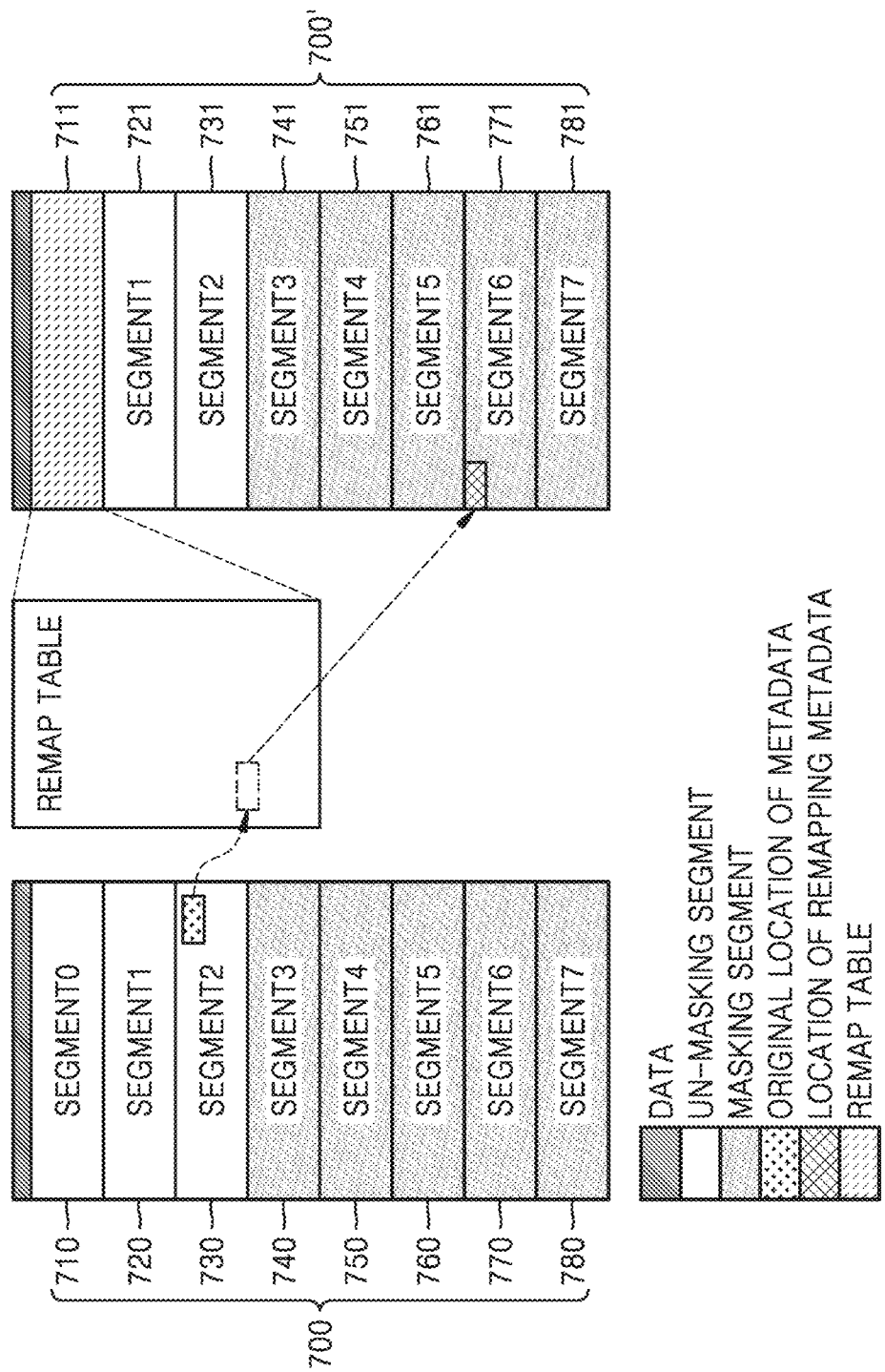
FIG. 7 is a diagram for explaining storing metadata to be cache hit in a masking segment, according to some example embodiments.

FIG. 7 is a diagram for explaining storing metadata to be cache hit in a masked segment, according to some example embodiments.

Referring to FIG. 7, a memory region 700 may represent a state in which metadata to be cache hit is stored in an original location (e.g., a storage space having a specific physical address of an unmasking segment). Another memory region 700' may represent a state in which metadata to be cache hit is stored in a specific location of the masking segment (e.g., a storage space having a specific physical address of the masking segment).

It may be assumed that the first to third segments 710 to 730 are unmasking segments and the fourth to eighth segments 740 to 780 are masking segments. In this case, the first segment group may include the first to third segments 710 to 730, and the second segment group may include the fourth to eighth segments 740 to 780. It may be assumed that metadata to be cache hit in the memory region 700 is stored in a storage space having a specific physical address in the third segment 730. It may be assumed that the metadata to be cache hit is some metadata stored in the cache memory 130 of FIG. 1. It may be assumed that metadata to be cache hit is stored in the seventh segment 771 of the memory region 700'.

For example, with reference to FIGS. 1 and 7, for some metadata stored in the cache memory, the memory controller 110 may control the main memory 120 to logically move the metadata to be cache hit from the third segment 730 to the seventh segment 771 based on the remap table by mapping a physical address of the third segment 730 in which metadata to be cache hit is stored to a physical address of the seventh segment 771. At this time, for metadata to be cache hit, mapping information between physical addresses of the third segment 730 and physical addresses of the seventh segment 771 may be included in the remap table.

In various example embodiments, the remap table may be stored in an unmasking segment. Referring to FIG. 7, for example, the remap table may be stored in the first segment 711.

Meanwhile, the data shown in FIG. 7 may include user data, code data for executing a program, and the like. Because the data needs to be preserved, the data may be stored in a storage space having specific physical addresses of the unmasking segment (e.g., the first segment 710, 711).

Figure 8:
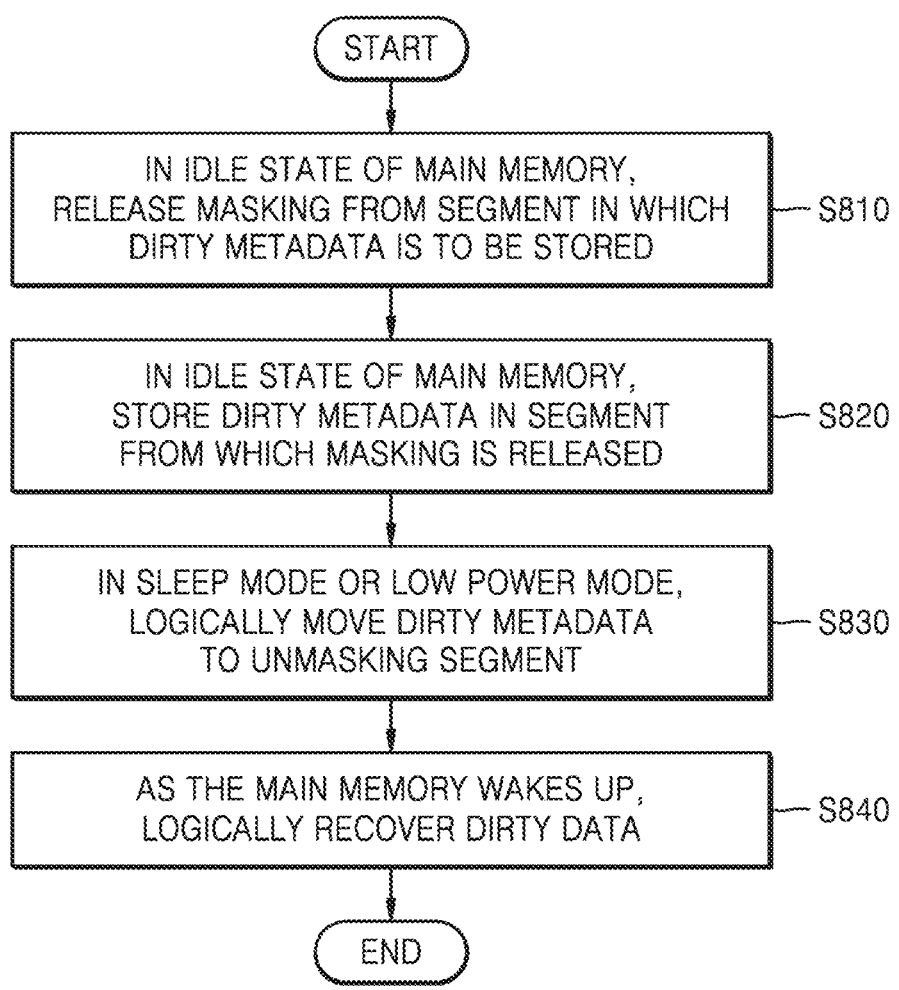
FIG. 8 is a flowchart illustrating a method of copying dirty metadata, according to some example embodiments.

FIG. 8 is a flowchart illustrating a method of copying dirty metadata, according to some example embodiments.

Referring to FIG. 8, in an idle state of a main memory, an operation of releasing a masking from a segment in which dirty metadata is to be stored is performed (S810). In various example embodiments, a segment in which dirty metadata is to be stored may be included in the second segment group described above.

In an idle state of the main memory, an operation of storing dirty metadata in a segment from which a masking is released is performed (S820).

In a sleep mode and/or a low power mode, an operation of logically moving dirty metadata to an unmasking segment is performed (S830). The unmasking segment may be a segment different from the segment unmasked in operations S810 and S820. In various example embodiments of operation S830, dirty metadata may be logically moved from the second segment group to the first segment group in a state in which the main memory enters a sleep mode or a low power mode from an idle state. Here, logically moving data may be different from physically moving data. The method of logically moving the data includes, for example, a method of mapping a physical address of a segment using a mapping table, or a method of logging information such as a physical address and an index of a location where the data was originally stored and the corresponding data, etc.

As the main memory wakes up, an operation of logically recovering dirty data is performed (S840). The logically recovering data may be logically moving data to its original storage location.

Figure 9A:
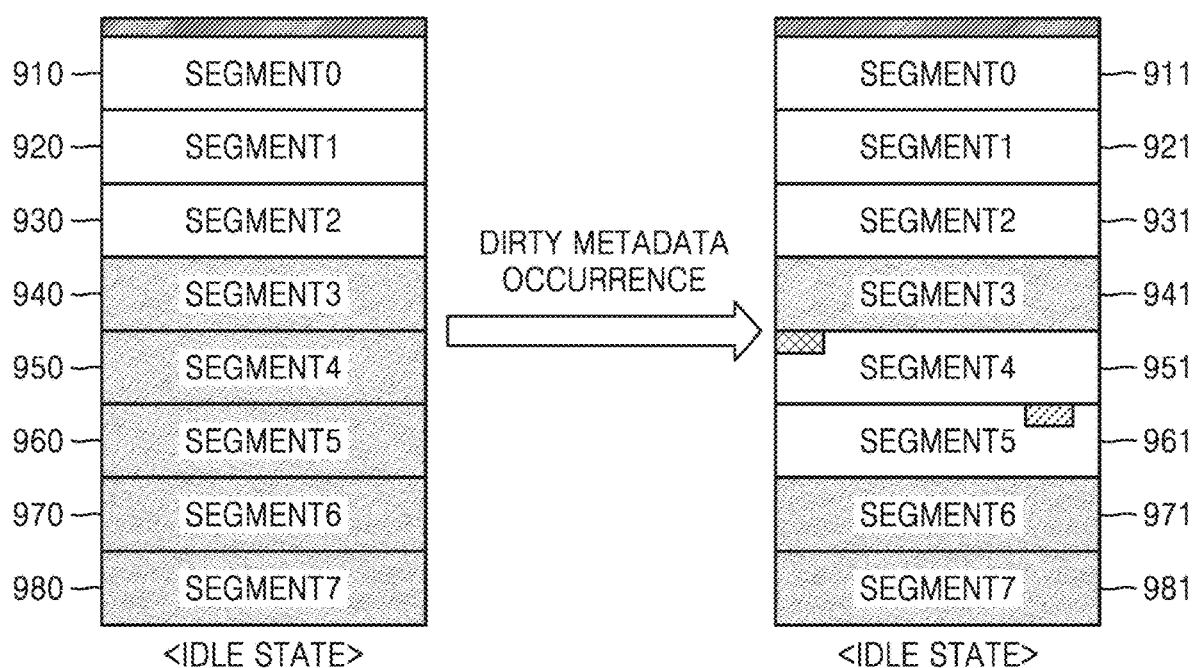
FIGS. 9A, 9B, and 9C are diagrams for explaining the method shown in FIG. 8 in detail.
Figure 9A:
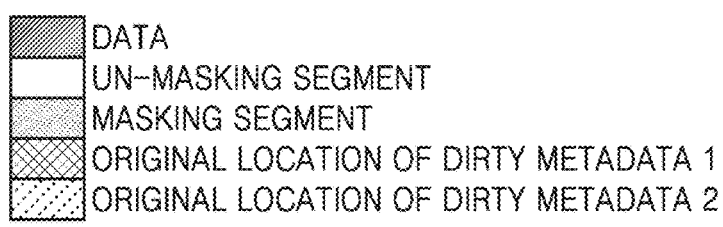
Figure 9B:
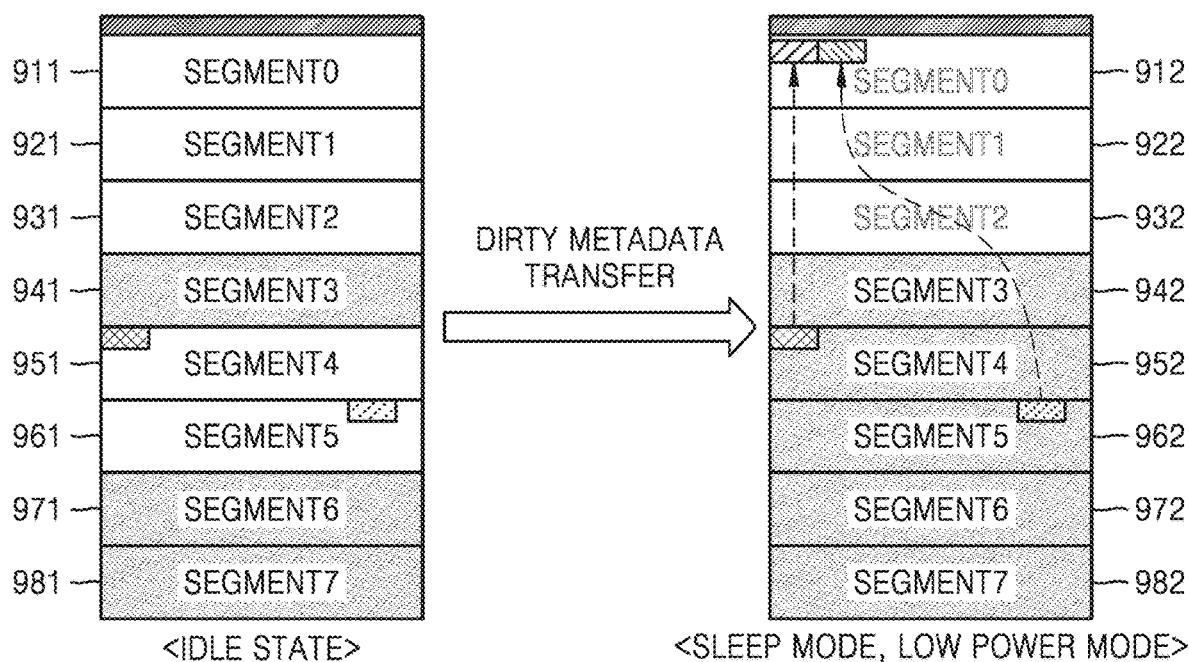
Figure 9B:
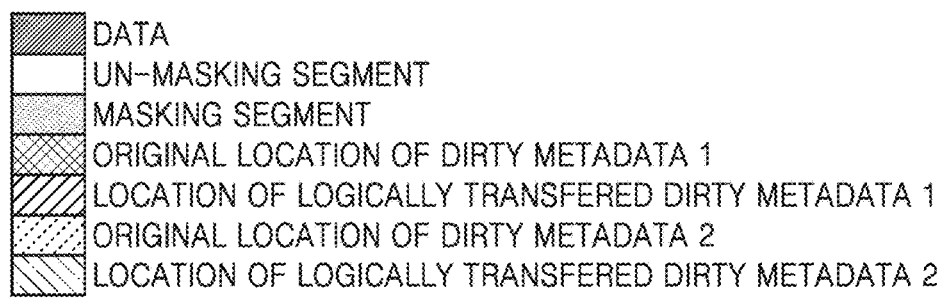
Figure 9C:
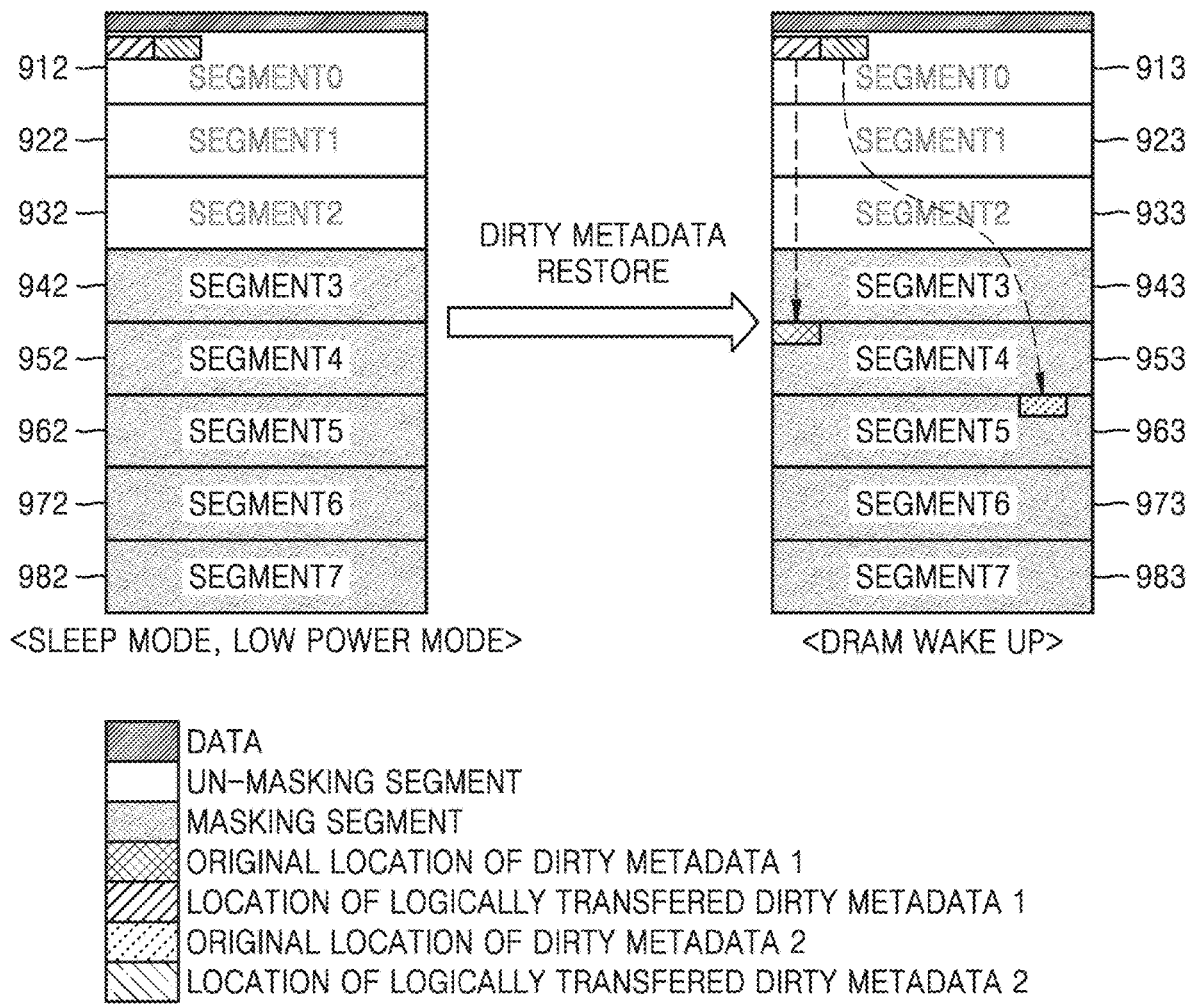

FIGS. 9A, 9B, and 9C are diagrams for explaining in detail the method shown in FIG. 8. Specifically, FIG. 9A is a diagram for explaining operations S810 and S820, FIG. 9B is a diagram for explaining an operation S830, and FIG. 9C is a diagram for explaining an operation S840.

Referring to FIGS. 9A, 9B, and 9C, it may be assumed that the first to third segments 910 to 930 are unmasking segments and the fourth to eighth segments 940 to 980 are masking segments.

Referring to FIG. 9A, when a cache miss occurs, dirty metadata may be generated. The dirty metadata may be stored in masking segments. There may be more than one dirty metadata. For example, in an idle state, first dirty metadata may be stored in the fifth segment 950 and second dirty metadata may be stored in the sixth segment 960. The memory controller 110 may release the masking of the fifth segment 950 and the sixth segment 960. Referring to FIGS. 1 and 4, for example, the memory controller 110 may provide the main memory 120 with a mode register write command and address instructing to write the operand code value (OP[7:0]) of the first mode register from "00011111B" to "00010011B" (however, example embodiments are not limited to the above). The memory controller 110 may provide the main memory 120 with a write command and an address instructing to store the first and second dirty data. The first dirty metadata may be stored in a storage space corresponding to a specific physical address of the unmasking fifth segment 951 (e.g., "ORIGINAL LOCATION OF DIRTY METADATA 1" in FIG. 9A). The second dirty metadata may be stored in a storage space corresponding to a specific physical address of the unmasking sixth segment 961 (e.g., "ORIGINAL LOCATION OF DIRTY METADATA 2" in FIG. 9A).

Referring to FIG. 9B, in a state in which the first and second dirty metadata are stored in each of the segments, the main memory 120 may enter a sleep mode or a low power mode from an idle state. In the sleep mode or the low power mode, the memory controller 110 may control the main memory 120 to logically move each of the first and second dirty metadata from a masking segment to an unmasking segment. The first and second dirty metadata may be sequentially moved from the empty storage space at the first logical address 912 (e.g., "LOCATION OF LOGICALLY TRANSFERRED DIRTY METADATA 1" and "LOCATION OF LOGICALLY TRANSFERRED DIRTY METADATA 2" in FIG. 9B). The memory controller 110 may mask again the segments from which a masking is released.

Referring to FIG. 9C, the main memory 120 may be woken up. In this case, the first and second dirty metadata moved to the first logical address 912 may be logically restored to the original storage location (e.g., "ORIGINAL LOCATION OF DIRTY METADATA 1" and "ORIGINAL LOCATION OF DIRTY METADATA 2" in FIG. 9C).

Figure 10:
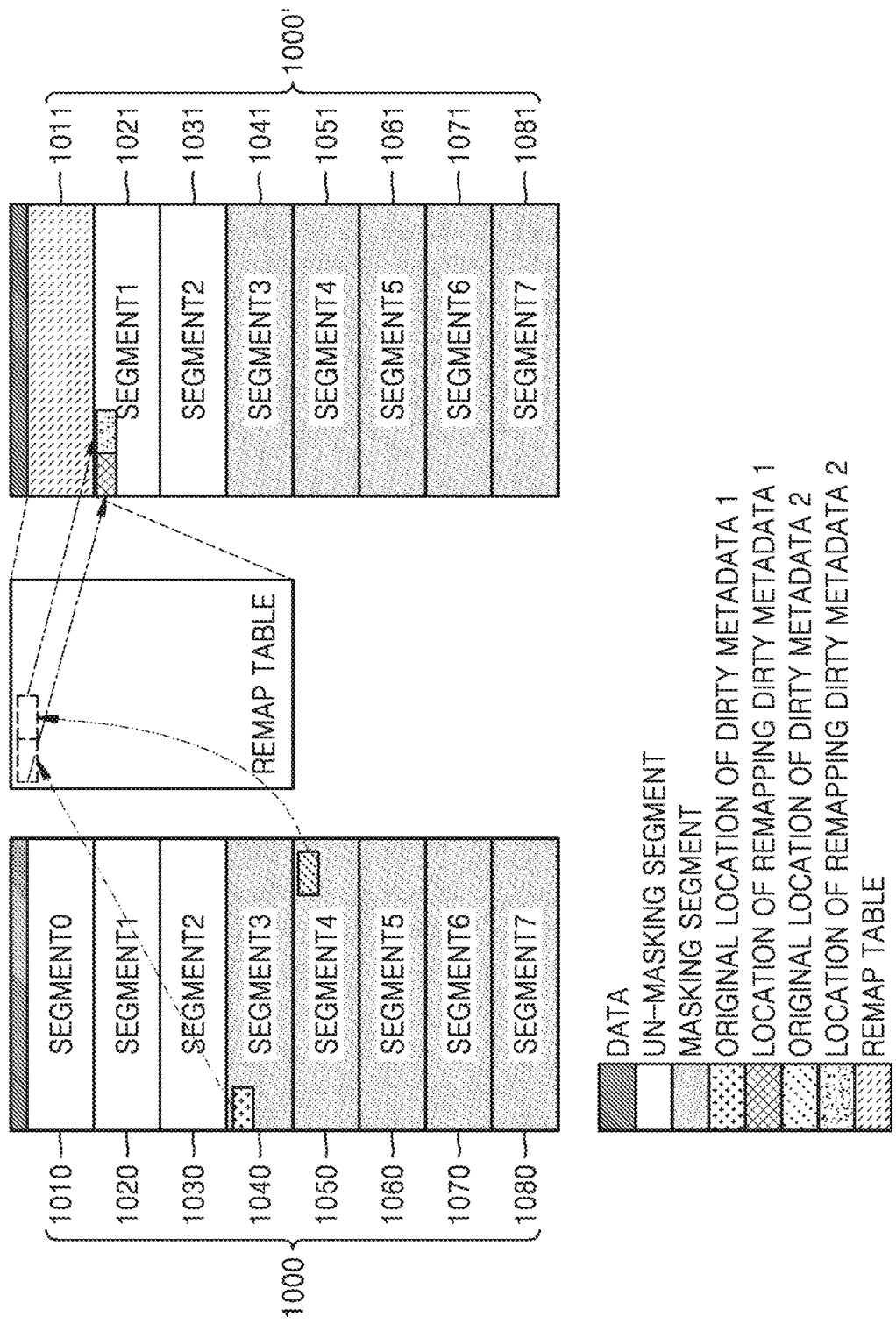
FIG. 10 is a diagram for explaining logically moving dirty metadata based on a remap table, according to some example embodiments.

FIG. 10 is a diagram for explaining logically moving dirty metadata based on a remap table, according to some example embodiments.

Referring to FIG. 10, a memory region 1000 may represent a state in which dirty metadata are stored in original locations (e.g., a storage space having a specific physical address of a masking segment). A memory region 1000' may represent a state in which dirty metadata are remapped to a specific location of an unmasking segment (e.g., a storage space having a specific physical address of the unmasking segment).

It may be assumed that first dirty metadata is stored in a storage space having a specific physical address of a fourth segment 1040 in the memory region 1000. It may also be assumed that second dirty metadata is stored in a storage space having a specific physical address of a fifth segment 1050 in the memory region 1000. It is assumed that the first and second dirty metadata are remapped to a second segment 1021 that is an unmasking segment in the memory region 1000'. It is assumed that first to third segments 1010 to 1030 are unmasking segments. It may also assumed that the fourth to eighth segments 1040 to 1080 are masking segments. The first segment group may include unmasking segments, and the second segment group may include masking segments.

In various example embodiments, when a cache miss occurs, for dirty metadata to be stored in the masking segment, the memory controller 110 may map a physical address of the masking segment in which the dirty metadata is to be stored to a physical address of an unmasking segment. For example, in the case of the first dirty metadata, mapping information obtained by mapping a specific physical address of the fourth segment 1040 and a first physical address of the second segment 1020 may be written to a remap table. In the case of the second dirty metadata, mapping information obtained by mapping a specific physical address of the fifth segment 1050 and a second physical address of the second segment 1020 may be written to the remap table.

In various example embodiments, the remap table may be stored in some of the plurality of segments. In this case, a specific physical address of a masking segment may be mapped to a specific physical address of a plurality of segments other than some of the segments. Referring to FIG. 10, for example, when the first and second dirty metadata are remapped to a second segment 1021, the remap table may be stored in a first segment 1011. Meanwhile, data that needs to be preserved shown in FIG. 10 may be stored in the first segment 1011 like the remap table.

Meanwhile, when the main memory 120 wakes up, the memory controller 110 may logically restore dirty metadata based on the remap table. For example, the memory controller 110 may logically restore dirty metadata by unmapping the mapping information (or mapping relationships) in the remap table.

Figure 11:
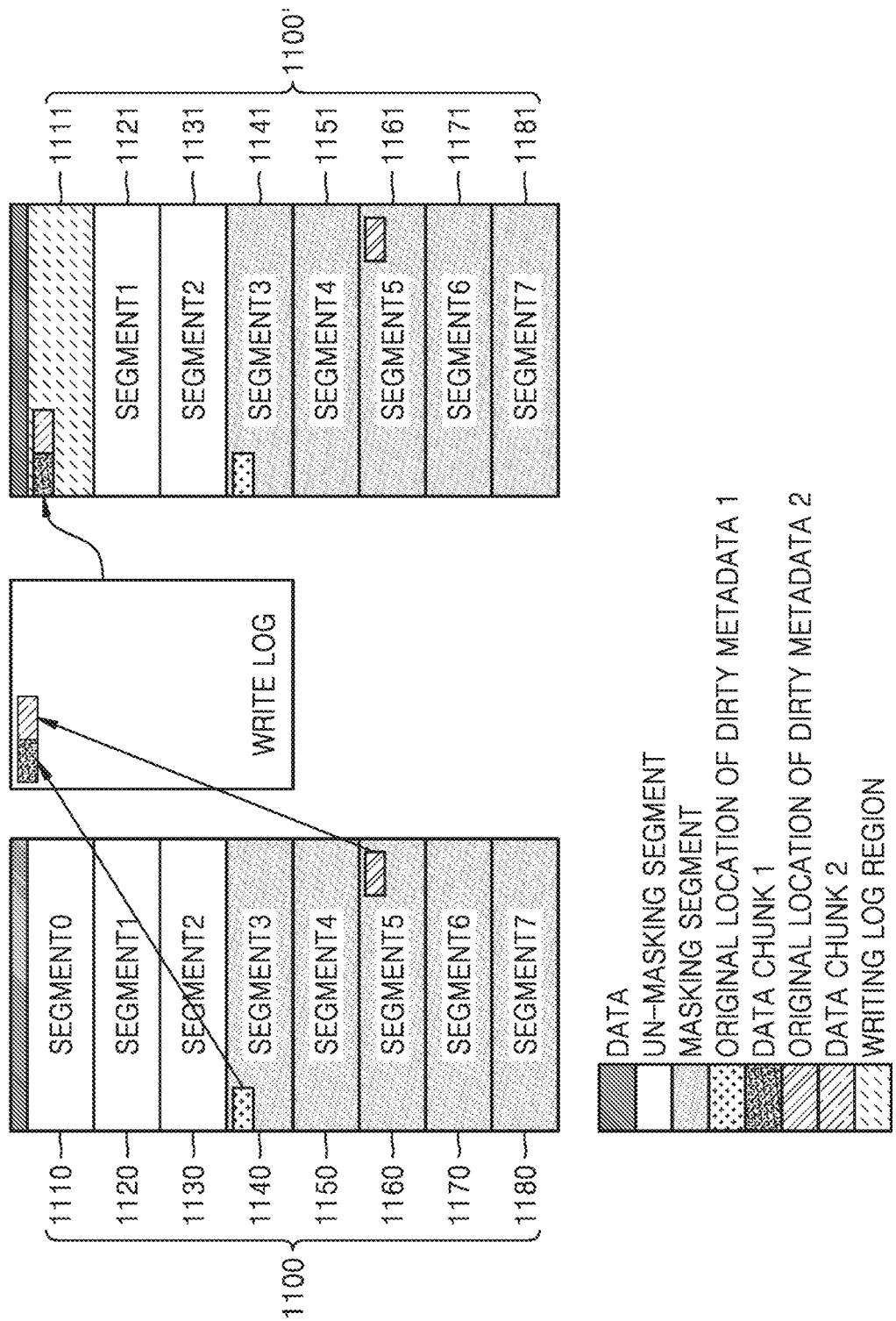
FIG. 11 is a diagram for explaining logically moving dirty metadata to a write log region, according to some example embodiments.

FIG. 11 is a diagram for explaining logically moving dirty metadata to a write log region, according to some example embodiments.

Referring to FIG. 11, a memory region 1100 may represent a state in which dirty metadata is stored in an original location. A memory region 1000' may represent a state in which data chunks are stored in a specific location of an unmasking segment.

In various example embodiments, when a cache miss occurs, for dirty metadata to be stored in the masking segment, the memory controller 110 may control the main memory 120 to store the dirty metadata and data chunks including write log data for the dirty metadata in an unmasking segment. The write log data may include, for example, information such as a physical address indicating an original location where dirty metadata is stored, an index, and the like.

For example, the first data chunk may include first dirty metadata and first write log data, and the second data chunk may include second dirty metadata and second write log data. The memory controller 110 may control the main memory 120 to log the first and second data chunks in a write log region.

In various example embodiments, the write log region in which data chunks are sequentially stored may be stored in some segments among a plurality of segments. Referring to FIG. 11, for example, the write log region may correspond to a part of the first segment 1111 in the memory region 1100'. Meanwhile, data that needs to be preserved shown in FIG. 11 may be stored in the remainder of the first segment 1111.

Meanwhile, when the main memory 120 wakes up, the memory controller 110 may control the main memory 120 to logically recover dirty metadata based on write log data. Because the write log data includes the physical address of the segment where the dirty metadata was originally stored and other necessary information, the memory controller 110 may control the main memory 120 to read write log data from the write log region and store the dirty metadata in the original location.

Figure 12:
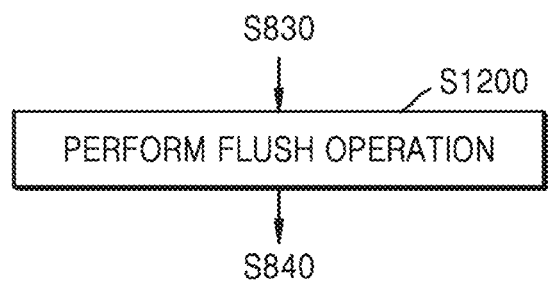
FIG. 12 is a flowchart illustrating a flush operation according to some example embodiments.

FIG. 12 is a flowchart illustrating a flush operation according to some example embodiments.

Referring to FIGS. 8 and 12, the operation S830 of FIG. 8 may be repeatedly performed. In this case, all dirty metadata may be stored in the unmasking segment. In this case, it may be difficult to store dirty metadata in the unmasking segment any longer unless the masking of the masking segment is additionally unmasked. When the masking of the masking segment is released to store additionally generated dirty metadata, power consumption of the main memory 120 according to the refresh operation may increase. Accordingly, a flush operation may be required to recognize dirty metadata stored in the unmasking segment as metadata to be cache hit. The flush operation may be referred to as a "cache flush". In various example embodiments, the flush operation may be an operation of loading dirty metadata stored in the unmasking segment into the cache memory 130.

In various example embodiments, after the operation S830 of FIG. 8 is performed, a flush operation is performed (S1200). After the operation S1200 is performed, the operation S830 of FIG. 8 may be performed.

As an example of operation S1200, an operation of performing a flush operation of emptying the first segment group may be performed in response to mapping of the dirty metadata to the storage space of the first segment group.

As another embodiment of operation S1200, an operation of performing a flush operation of emptying the first segment group may be performed in response to all of the plurality of data chunks being stored in a storage space of the first segment group.

In various example embodiments, when a flush operation is performed, the first segment group may be empty, and the first segment may be unmasked.

In the foregoing embodiments, the first segment group may include one or more unmasking segments. When there is one unmasking segment among the plurality of segments, the first segment group may be the one unmasking segment.

Figure 13:
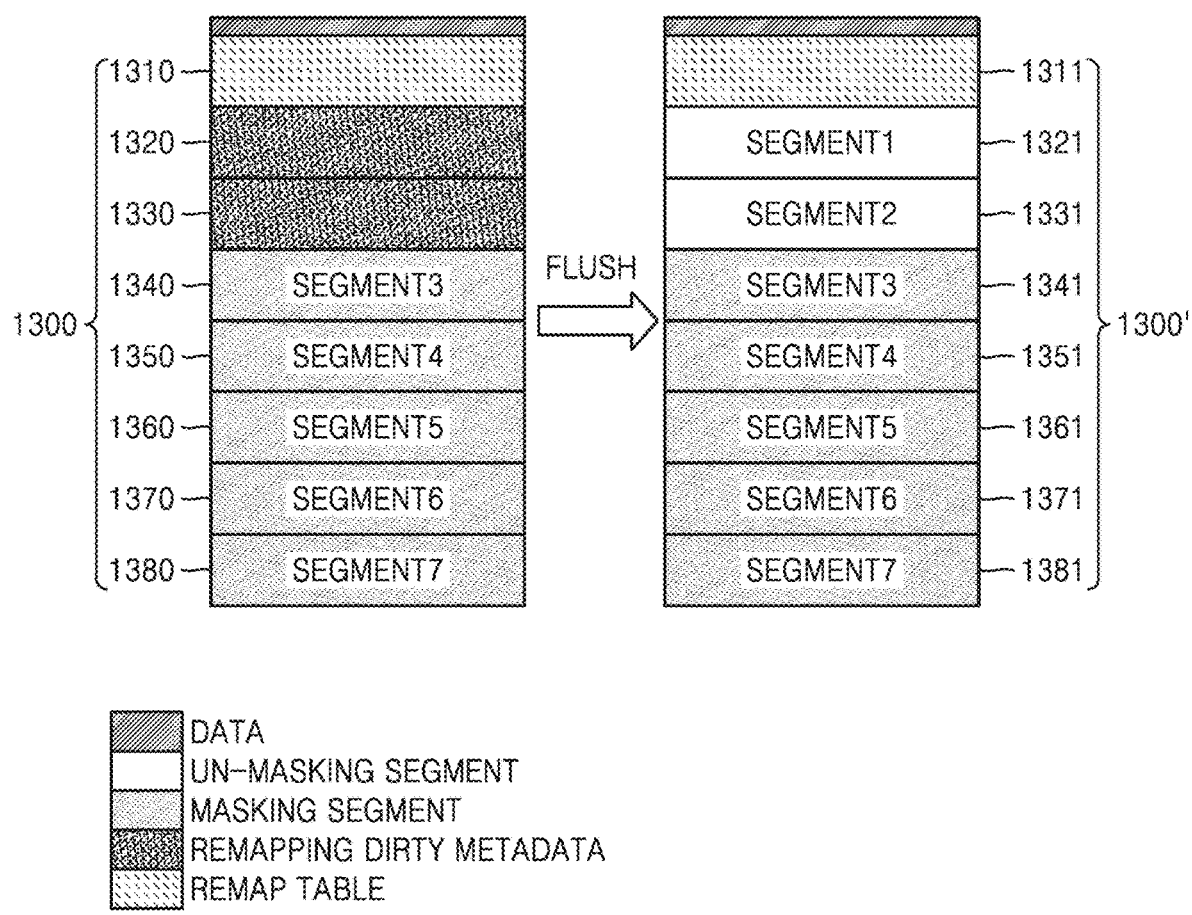
FIG. 13 is a diagram for explaining a flush operation performed in the embodiments shown in FIG. 10.

FIG. 13 is a diagram for explaining a flush operation performed in the embodiments shown in FIG. 10.

In various example embodiments, when a plurality of dirty metadata having a size corresponding to a storage space of the first segment group is stored in the first segment group, the memory controller 110 may control the main memory 120 to perform a flush operation to empty the first segment group. The first segment group may include one or more unmasking segments.

Referring to FIG. 13, it is assumed that, for example, a remap table is stored in a portion of a first segment 1310 in a memory region 1300. It is assumed that a plurality of dirty metadata is mapped to the second and third segments 1320 and 1330 in the memory region 1300. It is assumed that fourth to eighth segments 1340 to 1380 in the memory region 1300 are masking segments. In this case, a flush operation may be performed on the second and third segments 1320 and 1330. When the flush operation is completed, the second and third segments 1321 and 1331 in a memory region 1300' may be empty.

Figure 14:
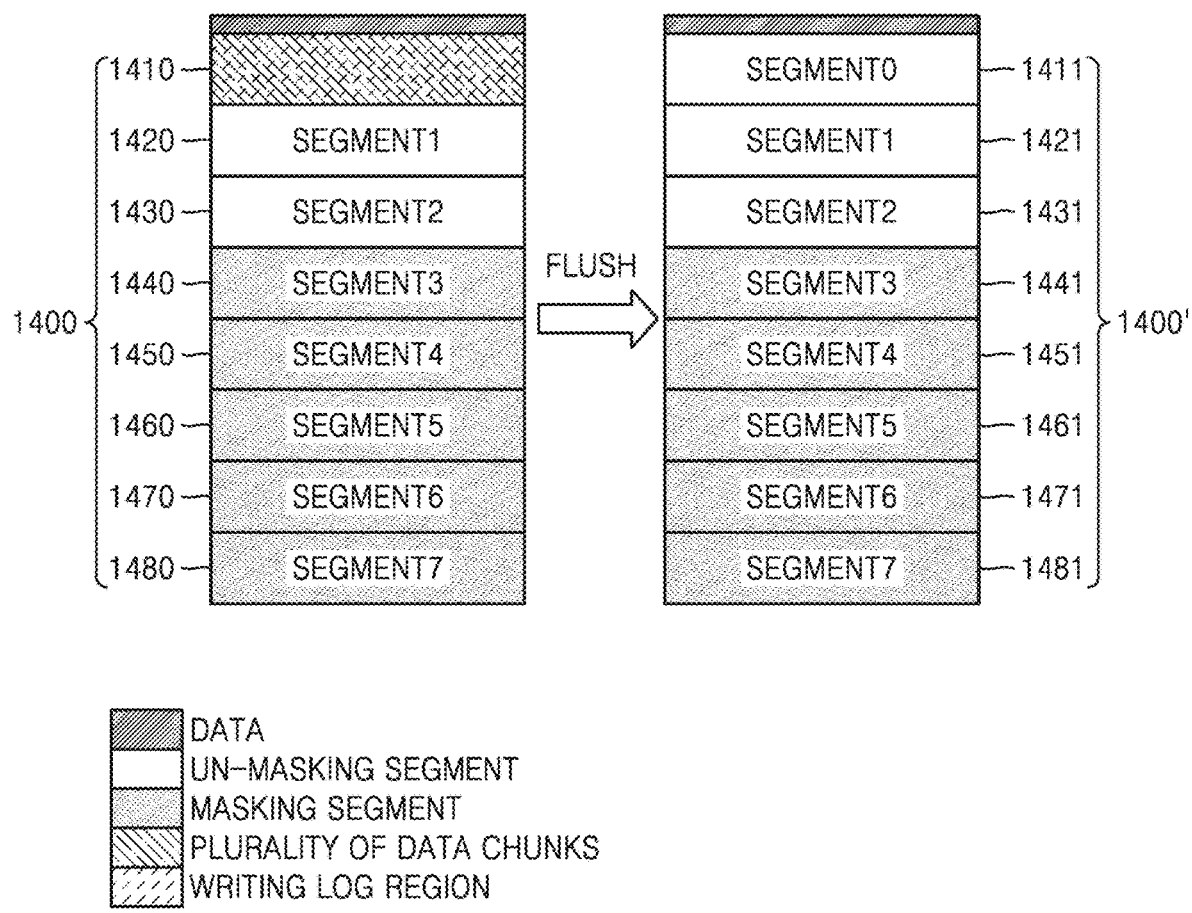
FIG. 14 is a diagram for explaining a flush operation performed in the embodiments shown in FIG. 11.

FIG. 14 is a diagram for explaining a flush operation performed in the embodiments shown in FIG. 11.

In various example embodiments, when a plurality of data chunks having a size corresponding to a storage space of the first segment group is stored in the first segment group, the memory controller 110 may control the main memory 120 to perform a flush operation to empty the first segment group. The first segment group may include one or more unmasking segments.

Referring to FIG. 14, it is assumed that, for example, a portion of a first segment 1410 in a memory region 1400 corresponds to a write log region. It is assumed that fourth to eighth segments 1440 to 1480 in the memory region 1400 are masking segments. When data chunks having a size as large as the storage space of the write log region are stored in the write log region, a flush operation may be performed on the write log region. When the flush operation is completed, a portion of a first segment 1411 corresponding to the write log region in a memory region 1400' may be empty. In addition, a portion of the first segment 1411 in the memory region 1400' may be an unmasking segment from which masking is released.

Figure 15:
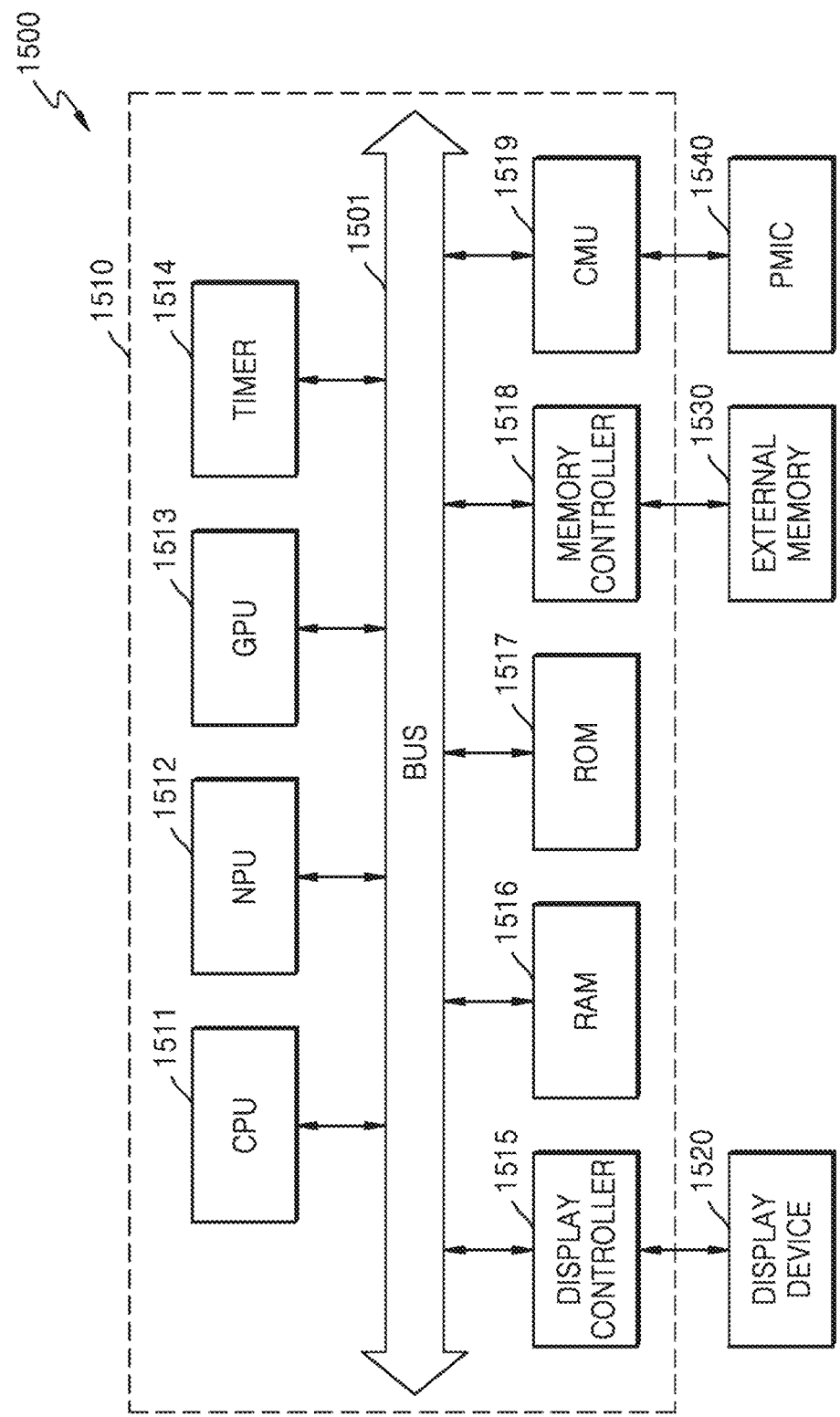
FIG. 15 is a block diagram illustrating an electronic device according to some example embodiments.

FIG. 15 is a block diagram illustrating an electronic device 1500 according to some example embodiments.

Referring to FIG. 15, the electronic device 1500 may be or include one or more of a computing system, for example, a computer, a laptop computer, a server, a workstation, a portable communication terminal, a personal digital assistant (PDA), a portable multimedia player (PMP), a smart phone, a wearable device, etc.

The electronic device 1500 may include a system on chip 1510, a display device 1520, an external memory 15300, and a power management integrated circuit (PMIC) 1540.

In various example embodiments, the system on a chip 1510 may perform one or more example embodiments described above with reference to FIGS. 1 to 14. For example, the system on chip 1510 may map a physical address of metadata to be cache hit and/or a physical address of dirty metadata based on a remap table. Alternatively or additionally, the system on chip 1510 may log dirty metadata and write log data Alternatively or additionally, the system on chip 1510 may perform a cache flush operation to cache dirty metadata.

The system on chip 1510 may include a central processing unit (CPU) 1511, a neural processing unit (NPU) 1512, a graphics processing unit (GPU) 1513, a timer 1514, a display controller 1515, a random-access memory (RAM) 1516, a read only memory (ROM) 1517, a memory controller 1518, a clock management unit (CMU) 1519, and a bus 1501. The system on chip 1510 may further include other components in addition to the components described above. For example, the electronic device 1500 may further include a display device 1520, an external memory 1530, and a PMIC 1540. The PMIC 1540 may be implemented outside the system on a chip 1510.

The CPU 1511 may be referred to as a processor and may process and/or execute programs and/or data stored in the external memory 1530. For example, the CPU 1511 may process or execute programs and/or data in response to an operation clock signal output from the CMU 1519.

The CPU 1511 may be implemented as a multi-core processor; however, example embodiments are not limited thereto. The multi-core processor is a computing component having two or more independent substantive processors (called 'cores'), and each of the processors may read and execute program instructions. Programs and/or data stored in the ROM 1517, the RAM 1516, and/or the external memory 1530 may be loaded into a memory (not shown) of the CPU 1511 as needed or desired.

The NPU 1512 may efficiently process large-scale calculations using an artificial neural network. The NPU 1512 may perform deep learning by supporting simultaneous matrix operations.

The GPU 1513 may convert read data read from the external memory 1530 by the memory controller 1518 into signals suitable for the display device 1520.

The timer 1514 may output a count value representing time based on an operation clock signal output from the CMU 1519.

The display device 1520 may display image signals output from the display controller 1515. The display controller 1515 may control the operation of the display device 1520.

The RAM 1516 may temporarily store programs, data, or instructions. For example, programs and/or data stored in the memory may be temporarily stored in the RAM 1516 under the control of the CPU 1511 or according to booting codes stored in the ROM 1517. The RAM 1516 may be implemented as a static RAM (SRAM). In various example embodiments, the RAM 1516 may act as cache memory 130 of FIG. 1.

The ROM 1517 may store permanent programs and/or data. The ROM 1517 may be implemented as an erasable programmable read-only memory (EPROM) or electrically erasable programmable read-only memory (EEPROM).

The memory controller 1518 may communicate with the external memory 1530 through an interface. The memory controller 1518 may control an overall operation of the external memory 1530. The memory controller 1518 may write data to the external memory 1530 or read data from the external memory 1530 according to a request of a host. Here, the host may be a master device, such as the CPU 1511, the GPU 1513, or the display controller 1515.

In various example embodiments, the memory controller 1518 may correspond to the memory controller 110 of FIG. 1.

The external memory 1530 is a storage medium for storing data, and may store an Operating System (OS), various programs, and/or various data. The external memory 1530 may be an SSD. However, the embodiment is not limited thereto.

When the external memory 1530 is implemented as an SSD, the external memory 1530 may include a volatile external memory (e.g., DRAM and/or SRAM) and/or a non-volatile external memory (e.g., one or more of flash memory, phase change RAM (PRAM), magnetic RAM (MRAM)), resistive RAM (RRAM), or FeRAM).

The CMU 1519 generates an operating clock signal. The CMU 1519 may include a clock signal generator, such as a phase locked loop (PLL), a delayed locked loop (DLL), or a crystal oscillator. An operating clock signal may be supplied to the GPU 1513. The operation clock signal may also be supplied to other components (e.g., the CPU 1511 or the memory controller 1518). The CMU 1519 may change a frequency of the operating clock signal.

Any or all of the elements described with reference to FIG. 14 may communicate with any or all other elements described with reference to FIG. 14 For example, any element may engage in one-way and/or two-way and/or broadcast communication with any or all other elements in FIG. 1, to transfer and/or exchange and/or receive information such as but not limited to data and/or commands, in a serial and/or parallel manner, via a wireless and/or a wired bus (not illustrated). The information may be in encoded various formats, such as in an analog format and/or in a digital format.

For example, each of the CPU 1511, NPU 1512, GPU 1513, timer 1514, display controller 1515, RAM 1516, ROM 1517, memory controller 1518, and CMU 1519 may communicate with each other through the bus 1501, which may be a wired bus and/or a wireless path.

The structure of various example embodiments may be modified or changed in various ways without departing from the scope or spirit of the inventive concepts. In view of the foregoing, inventive concepts cover variations and modifications provided that such modifications and variations fall within the scope of the following claims and equivalents.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While certain example embodiments have been particularly shown and described, it will be understood that various changes in form and details may be made therein without departing from the spirit and scope of the following claims. Additionally, example embodiments are not necessarily mutually exclusive. For example, some example embodiments may include one or more features described with reference to one or more figures and may also include one or more other features described with reference to one or more other figures.

What is claimed is:

1. A storage device comprising:
   a main memory comprising a first segment in which a refresh operation is configured to be enabled, and a second segment that is masked so as to be configured to disable the refresh operation;
   a cache memory configured to store some metadata stored in the main memory; and
   a memory controller configured to control the main memory, so as to have dirty metadata stored in the second segment in response to a cache miss occurring, and to logically move the dirty metadata from the second segment to the first segment by mapping a physical address of the second segment in which the dirty metadata is to be stored to a physical address of the first segment.

2. The storage device of claim 1, wherein the memory controller is configured to control the main memory, so as to have portion of the metadata stored in the cache memory to logically move the metadata to be cache hit from the first segment to the second segment by mapping a physical address of the first segment, in which the metadata to be cache hit is stored to a physical address of the second segment.

3. The storage device of claim 1, wherein the memory controller is configured to control the main memory to perform a flush operation of emptying the first segment in response to a plurality of dirty metadata having a size corresponding to a storage space of the first segment being mapped to the first segment.

4. The storage device of claim 1, wherein
the memory controller is configured to control the main memory to release the masking of the second segment in response to the dirty metadata being stored in the second segment in an idle state of the main memory, and
to store the dirty metadata in the second segment from which the masking is released.

5. The storage device of claim 4, wherein
the memory controller is configured to control the main memory to logically move the dirty metadata from the second segment to the first segment in response to the main memory entering a sleep mode or a low power mode from the idle state, and
to mask the second segment.

6. The storage device of claim 4, wherein the memory controller is configured to control the main memory to logically restore the dirty metadata to the second segment in response to the main memory being woken up.

7. The storage device of claim 1, wherein the main memory further includes a third segment in which the refresh operation is configured to be enabled, and
the memory controller is configured to store a remap table in the third segment.

8. The storage device of claim 1, wherein the main memory further includes a first mode register configured to store a code value of an operand related to whether or not the refresh operation is allowed for each of the first segment and the second segment.

9. The storage device of claim 8, wherein the main memory further includes a second mode register configured to store a code value of an operand indicating whether Partial Array Refresh Control (PARC) is supported or not.

* * * * *